United States Patent
Nagaoka

(10) Patent No.: US 9,664,131 B2
(45) Date of Patent: May 30, 2017

(54) EXHAUST INJECTION CONTROL METHOD FOR EXHAUST GAS POST-TREATMENT DEVICE

(71) Applicant: ISUZU MOTORS LIMITED, Tokyo (JP)

(72) Inventor: Daiji Nagaoka, Kamakura (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 14/782,989

(22) PCT Filed: Mar. 5, 2014

(86) PCT No.: PCT/JP2014/055611
§ 371 (c)(1),
(2) Date: Oct. 7, 2015

(87) PCT Pub. No.: WO2014/171213
PCT Pub. Date: Oct. 23, 2014

(65) Prior Publication Data
US 2016/0319756 A1    Nov. 3, 2016

(30) Foreign Application Priority Data
Apr. 16, 2013    (JP) .................................. 2013-085799

(51) Int. Cl.
*F02D 41/02*    (2006.01)
*F01N 3/36*    (2006.01)
(Continued)

(52) U.S. Cl.
CPC .......... *F02D 41/029* (2013.01); *F01N 3/0253* (2013.01); *F01N 3/36* (2013.01);
(Continued)

(58) Field of Classification Search
CPC .......... F01N 3/023; F01N 3/025; F01N 3/029; F01N 3/36; F01N 3/0253; F02D 41/04
(Continued)

(56) References Cited

U.S. PATENT DOCUMENTS

2004/0244366 A1* 12/2004 Hiranuma ............. F02D 41/029
60/286
2005/0217251 A1* 10/2005 Sato ........................ F02D 9/04
60/295
(Continued)

FOREIGN PATENT DOCUMENTS

JP    2003-155917    5/2003
JP    2005-282478    10/2005
(Continued)

OTHER PUBLICATIONS

JP 2010144525 Machine Translation, Translated on Oct. 10, 2016.*
(Continued)

*Primary Examiner* — Patrick Maines
(74) *Attorney, Agent, or Firm* — Staas & Halsey LLP

(57) ABSTRACT

When particulate matter (PM) has accumulated on a diesel particulate filter (DPF), multiple-injection, post injection, and exhaust pipe injection are performed such that a reduction gas is burned in a diesel oxidation catalyst (DOC) to raise the exhaust gas temperature, burn the PM accumulated on the DPF, and regenerate the DPF. A light-off performance map is prepared, in advance, by determining burning efficiency relative to the DOC temperature during the post injection and the exhaust pipe injection, both when the catalyst is fresh and when the catalyst has deteriorated. The DOC temperature suitable for the exhaust pipe injection is set from a degree of the catalyst deterioration on the basis of the light-off performance map. The multiple-injection and/or the post injection is performed when the DOC temperature is less than the set temperature, and the exhaust pipe
(Continued)

injection is performed when the DOC temperature is equal to or greater than the set temperature.

5 Claims, 2 Drawing Sheets

(51) Int. Cl.
*F01N 3/025* (2006.01)
*F01N 9/00* (2006.01)
*F02D 41/40* (2006.01)

(52) U.S. Cl.
CPC ............ *F01N 9/002* (2013.01); *F02D 41/025* (2013.01); *F02D 41/0235* (2013.01); *F02D 41/405* (2013.01); *F01N 2610/146* (2013.01); *F01N 2900/0412* (2013.01); *F01N 2900/1404* (2013.01); *F02D 41/402* (2013.01); *F02D 2200/0802* (2013.01); *Y02T 10/26* (2013.01); *Y02T 10/44* (2013.01)

(58) Field of Classification Search
USPC .......................................... 60/295, 286, 285
See application file for complete search history.

(56) References Cited

U.S. PATENT DOCUMENTS

| | | | |
|---|---|---|---|
| 2009/0145115 A1* | 6/2009 | Torisaka | F01N 3/0253 60/286 |
| 2009/0165444 A1 | 7/2009 | Oosumi | |
| 2010/0307132 A1* | 12/2010 | Yuza | B01D 53/9472 60/274 |
| 2013/0081543 A1 | 4/2013 | Ikeda et al. | |

FOREIGN PATENT DOCUMENTS

| | | | |
|---|---|---|---|
| JP | 2006-83746 | | 3/2006 |
| JP | 2007-162578 | | 6/2007 |
| JP | 2008-31940 | | 2/2008 |
| JP | 2009-2270 | | 1/2009 |
| JP | 2010116818 A | * | 5/2010 |
| JP | 2010-144525 | | 7/2010 |
| JP | 2010144525 A | * | 7/2010 |
| JP | 2011-256848 | | 12/2011 |
| JP | 2011241690 A | * | 12/2011 |
| JP | 2011247140 A | * | 12/2011 |
| JP | 2011256848 A | * | 12/2011 |
| JP | 2012-36760 | | 2/2012 |
| JP | 2012-127297 | | 7/2012 |

OTHER PUBLICATIONS

Espacenet Abstract, Publication No. 2010-144525, published Jul. 1, 2010.
J-Plat Pat Abstract, Publication No. 2011-256848, published Dec. 22, 2011.
Espacenet Abstract, Publication No. 2007-162578, published Jun. 28, 2007.
Espacenet Abstract, Publication No. 2009-002270, published Jan. 8, 2009.
Espacenet Abstract, Publication No. 2012-127297, published Jul. 5, 2012.
International Search Report mailed Jun. 3, 2014 in International Patent Application No. PCT/JP2014/055611.
PCT International Preliminary Report on Patentability dated Oct. 20, 2015 in corresponding International Patent Application No. PCT/JP2014/055611.
Extended European Search Report dated Nov. 15, 2016 in corresponding European Patent Application No. 14785232.1.
J-Plat Pat English Language Abstract for JP 2012-036760, published Feb. 23, 2012.
J-Plat Pat English Language Abstract for JP 2005-282478, published Oct. 13, 2005.
J-Plat Pat English Language Abstract for JP 2003-155917, published May 30, 2003.
J-Plat Pat English Language Abstract for JP 2006-083746, published Mar. 30, 2006.
J-Plat Pat English Language Abstract for JP 2008-031940, published Feb. 14, 2008.

* cited by examiner

EXHAUST INJECTION CONTROL METHOD FOR EXHAUST GAS POST-TREATMENT DEVICE

CROSS-REFERENCE TO RELATED APPLICATIONS

This application is a U.S. National Stage Application, which claims the benefit under 35 U.S.C. §371 of PCT International Patent Application No. PCT/JP2014/055611, filed Mar. 5, 2014, which claims the foreign priority benefit under 35 U.S.C. §119 of Japanese Patent Application No. 2013-085799, filed Apr. 16, 2013, the contents of which are incorporated herein by reference.

TECHNICAL FIELD

The present invention relates to an exhaust gas post-treatment device having a diesel particulate filter (DPF), and more specifically to a method of controlling exhaust injection in an exhaust gas aftertreatment device that can optimally control post injection and exhaust pipe injection when burning particulate matter (PM), which has accumulated in the DPF, for regeneration of the DPF.

BACKGROUND ART

Diesel oxidation catalyst (DOC) systems, DPF systems, NOx occlusion reduction catalyst (lean NOx trap (LNT) or NOx storage reduction (NSR)) systems, urea selective catalytic reduction (SCR) systems, and so on are in practical use for exhaust gas aftertreatment devices of diesel engines.

Out of the above-mentioned systems, the DOC systems and the DPF systems are effective systems for reducing PM. Although the DOC, which is provided at an upstream position in the exhaust passage, is not capable of oxidizing solid soot, the DOC oxidizes a large portion of soluble organic fraction (SOF), which accounts for 30 to 70% of the total PM, and also removes hydro carbon (HC) and CO at the same time. The DPF, which is provided at a downstream position, is formed of porous ceramics or the like having a fine pore size and captures a large portion of the PM contained in the exhaust gas.

When an amount of PM captured and accumulated in the DPF reaches a predetermined amount, regeneration is forcibly applied to the DPF in order to remove the accumulated PM. The regeneration of the DPF is carried out by multiple-injection, post injection, exhaust pipe injection or the like such that the fuel is oxidized and burned in the DOC to raise the exhaust gas temperature, and the PM accumulated in the DPF is burned and removed.

The exhaust pipe injection has advantages over fuel injection into cylinders during an expansion stroke of combustion (so-called post injection). For example, the fuel does not dilute the oil and the entire amount of injected fuel can be used for temperature elevation so that the fuel efficiency deterioration in connection with the temperature elevation is reduced.

LISTING OF REFERENCES

PATENT LITERATURE 1: Japanese Patent Application Laid-Open Publication (Kokai) No. 2007-162578
PATENT LITERATURE 2: Japanese Patent Application Laid-Open Publication (Kokai) No. 2009-002270
PATENT LITERATURE 3: Japanese Patent Application Laid-Open Publication (Kokai) No. 2012-127297

However, the HC feeding by the exhaust pipe injection has a problem, i.e., decomposition into HC takes more time if the exhaust gas temperature is low. Specifically, when the exhaust pipe injection is used and the exhaust gas temperature is equal to or lower than 220 degrees C., the light-off performance is bad even if the catalyst (DOC) is fresh. The exhaust gas temperature should be raised to 220 degrees C. or higher because the activation temperature (light-off temperature) shifts to a higher temperature, as compared to the post injection into the cylinders. Accordingly, the post injection is performed in a low temperature region (when the exhaust gas temperature is low), and the exhaust injection or multiple-injection is performed in medium and high temperature regions (when the exhaust gas temperature is medium and high). Thus, there is a problem, i.e., the exhaust injection should wait until the exhaust gas temperature is elevated to a level that ensures appropriate exhaust injection.

As the catalyst deteriorates (the activation temperature shifts to a higher temperature due to noble metal sintering or the like), the light-off temperature also shifts to a higher temperature. Accordingly, the temperature elevation caused by the exhaust pipe injection does not function in a desired manner during the DPF regeneration. As a result, white smoke is generated and/or poisoning takes place due to HC. Then, HC is instantaneously burned upon subsequent elevation of the exhaust gas temperature, i.e., abnormal temperature elevation occurs. In the worst scenario, the catalyst may melt and break.

SUMMARY OF THE INVENTION

Therefore, an object of the present invention is to solve the above-described problems and to provide a method of controlling the exhaust injection in an exhaust gas aftertreatment device that can ensure optimal exhaust pipe injection in accordance with a catalyst temperature and the degree of catalyst deterioration when performing the exhaust pipe injection during the DPF regeneration.

To achieve the above-mentioned object, the present invention provides a method of controlling exhaust injection in an exhaust gas aftertreatment device. The exhaust gas aftertreatment device includes an exhaust pipe injector provided in an exhaust pipe of an engine for injecting fuel into the exhaust pipe (for performing exhaust pipe injection), a DOC connected to the exhaust pipe downstream of the exhaust pipe injector, and a DPF connected to the exhaust pipe downstream of the exhaust pipe injector. The exhaust gas aftertreatment device is configured to perform multiple-injection, post injection, and/or exhaust pipe injection when PM accumulates in the DPF, thereby burning a reduction gas in the DOC, raising an exhaust gas temperature, burning the PM, which has accumulated in the DPF, for regeneration of the DPF. The method includes preparing, in advance, a light-off performance map that indicates a burning efficiency (combustion efficiency) relative to the DOC temperature in the post injection and in the exhaust pipe injection, when the catalyst is fresh and when the catalyst has deteriorated. When regenerating the DPF, the method also includes setting the catalyst temperature that is suitable for the exhaust pipe injection, using the degree of the catalyst deterioration, on the basis of the light-off performance map. The method also includes performing the multiple-injection and/or the post injection when the catalyst temperature is lower than the set catalyst temperature, and performing the exhaust pipe injection when the catalyst temperature reaches or exceeds the set catalyst temperature.

Preferably, the light-off performance map defines (decides) the activation temperatures from the light-off performance of the catalyst in the multiple-injection region, the post injection region and the exhaust pipe injection region. Preferably, the multiple-injection, the post injection and the exhaust pipe injection are sequentially selected on the basis of the catalyst temperature.

Preferably, the multiple-injection, the post injection, or the exhaust pipe injection is selected on the basis of the catalyst temperature. Preferably, the degree of the deterioration of the catalyst is determined (obtained) from the exhaust gas temperature at an inlet and an outlet of the catalyst on the basis of the light-off performance map, and the light-off performance is corrected (adjusted) on the basis of the degree of the deterioration of the catalyst. Preferably, the multiple-injection region, the post injection region, and the exhaust pipe injection region are changed on the basis of the corrected light-off performance.

The present invention prepares, in advance, a map of light-off performance of the catalyst, and selects one of the multiple-injection, the post injection and the exhaust pipe injection in accordance with the catalyst temperature and the degree of the catalyst deterioration. Thus, the present invention can demonstrate an excellent advantage, i.e., the exhaust pipe injection is carried out in an optimal condition.

DETAILED DESCRIPTION

Preferred embodiments of the present invention will be described in detail with reference to the accompanying drawings.

Figure 1:
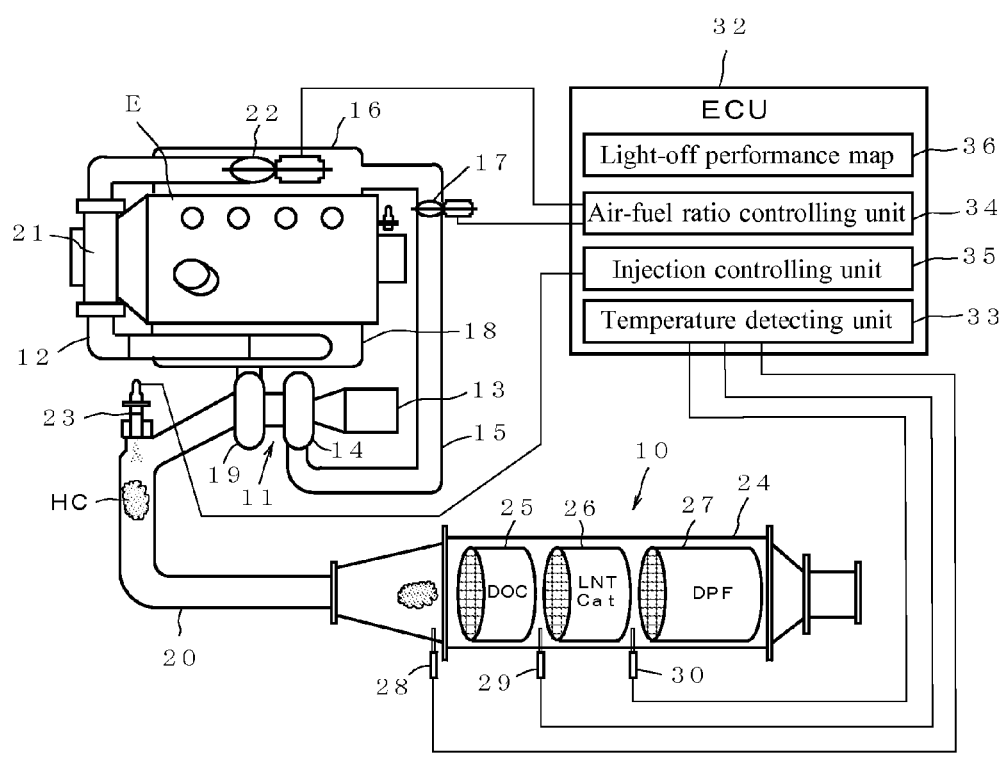
FIG. 1 illustrates a device configuration that is used with a method of controlling exhaust injection in an exhaust gas aftertreatment device according to an embodiment of the present invention.

FIG. 1 shows an exhaust gas aftertreatment device 10 that includes a NOx occlusion reduction catalyst.

A turbocharger 11 and an exhaust gas recirculation ("EGR") pipe 12 are connected to an intake part and an exhaust part of an engine E. The air taken in through an air cleaner 13 is compressed by a compressor 14 of the turbocharger 11. The compressed air is sent to an intake passage 15, and supplied into the engine E through an intake manifold 16 of the engine E. An intake valve 17 is provided in the intake passage 15 to regulate an amount of air introduced to the engine E.

An exhaust gas emitted from the engine E is discharged to a turbine 19 of the turbocharger 11 through an exhaust manifold 18 to drive the turbine 19 and discharged to an exhaust pipe 20.

The EGR pipe 12 is connected to the intake manifold 16 and the exhaust manifold 18. An EGR cooler 21 and an EGR valve 22 are connected to the EGR pipe 12. The EGR cooler 21 cools the exhaust gas flowing from the exhaust manifold 18 to the intake manifold 16, and the EGR valve 22 regulates the amount of EGR.

The exhaust gas aftertreatment device 10 has an exhaust pipe injector 23 provided in the exhaust pipe 20 downstream of the turbine 19. The exhaust gas aftertreatment device 10 also has a DOC 25, a NOx occlusion reduction catalyst 26, and a DPF 27 that are housed in this order in a receptacle 24. The receptacle 24 is formed in the exhaust pipe 20 downstream of the exhaust pipe injector 23.

A DOC inlet temperature sensor 28 is provided in the exhaust pipe 20 upstream of the DOC 25. A catalyst inlet temperature sensor 29 is provided at or near an inlet of the NOx occlusion reduction catalyst 26. A catalyst outlet temperature sensor 30 is provided at or near an outlet of the NOx occlusion reduction catalyst 26.

An ECU 32 controls overall operations (driving) of the engine E. The ECU 32 includes a temperature detecting unit 33, an air-fuel ratio controlling unit 34, and an injection controlling unit 35. A light-off performance map 36 of the catalyst (DOC) is stored in the ECU 32.

Detections values of the temperature sensors 28 to 30 located between the engine outlet and the catalyst outlet are entered to the temperature detecting unit 33 of the ECU 32, which controls the driving of the engine E.

The air-fuel ratio controlling unit 34 controls the EGR valve 22 and the intake valve 17. The injection controlling unit 35 controls an amount of fuel injection of the engine E and also controls the multiple-injection and the post injection from the injector. The injection controlling unit 35 also controls the fuel to be injected from the exhaust pipe injector 23.

The exhaust gas aftertreatment device 10, which includes the NOx occlusion reduction catalyst, normally stores NOx onto the NOx occlusion reduction catalyst 26 in a lean state (state of the air-fuel ratio being lean). In the meanwhile, the exhaust gas aftertreatment device 10 injects the fuel HC in pulses from the exhaust pipe injector 23 so as to reduce and purify NOx in a rich state (state of the air-fuel ratio being rich).

PM contained in the exhaust gas is captured by the DPF 27. When a predetermined amount of PM has accumulated in the DPF 27, e.g., when a pressure difference across the DPF 27 has reached a prescribed value or when a vehicle has traveled a predetermined distance, the ECU 32 carries out automatic regeneration control on the PM. During this PM regeneration, the exhaust gas temperature is raised to 600 degrees C. by carrying out post injection or injecting fuel through the exhaust pipe injector 23, and thus the PM that has accumulated in the DPF 27 is burned.

When the fuel HC is injected during the PM regeneration, the ECU 32 estimates the catalyst temperature (DOC temperature) on the basis of the exhaust gas temperatures, which are introduced to the temperature detecting unit 33 from the temperature sensors 28-30. Using the light-off performance map 36, the ECU 32 selects the multiple-injection, the post injection or the exhaust pipe injection. For this selection, when the catalyst temperature is low, the multiple-injection and the post injection are carried out or the multiple-injection is only carried out to regenerate the DPF 27. When the catalyst temperature becomes equal to or higher than the set temperature, which is suitable for the exhaust pipe injection, then the exhaust pipe injection is carried out to regenerate the DPF 27.

The light-off performance map 36 will be described with reference to FIG. 2.

Figure 2:
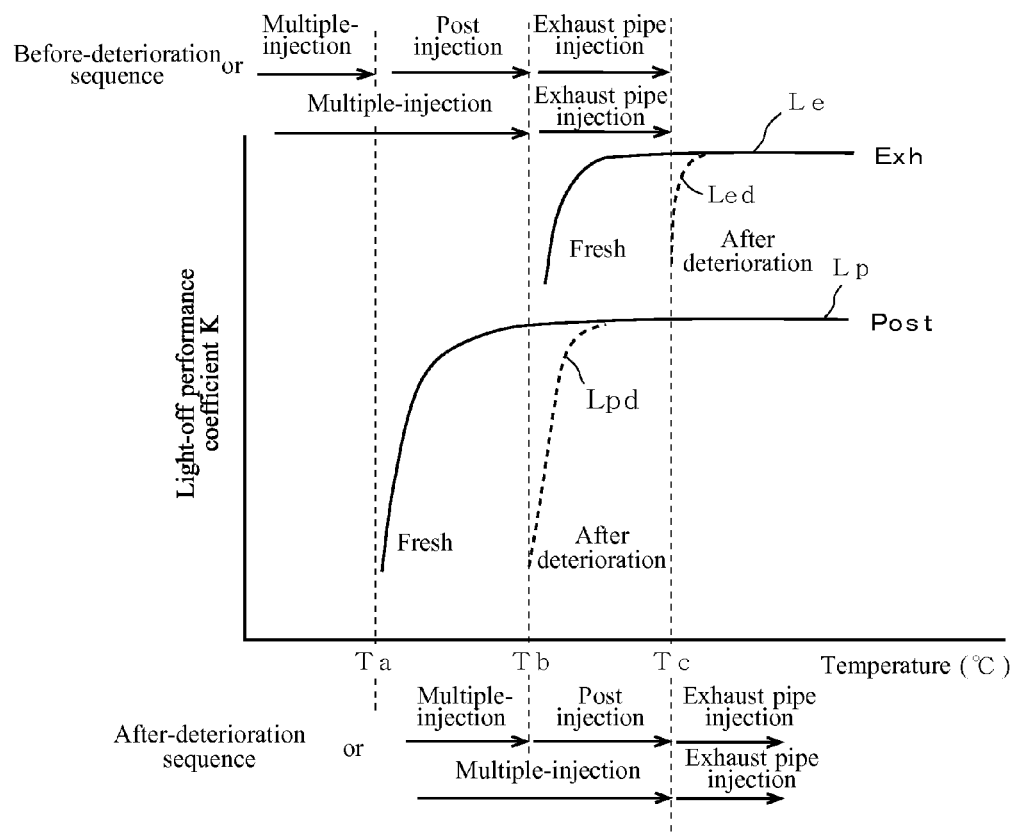
FIG. 2 shows a light-off performance map according to the embodiment of the present invention.

In FIG. 2, the horizontal axis indicates the catalyst temperature, and the vertical axis indicates the combustion efficiency (burning efficiency) K, which represents the light-off performance of the fuel. FIG. 2 shows a light-off performance curve Lp that is obtained when the post injection is carried out at different catalyst temperatures, and shows another light-off performance curve Le that is obtained when the exhaust pipe injection is carried out at different catalyst temperatures.

The light-off performance curves Lp and Le are the solid lines and indicate a state when the catalyst is fresh. Performance curves Lpd and Led, which are shown by the broken lines, indicate a state after the catalyst is deteriorated.

The light-off performance curve Lp for the post injection draws a curve that is about 5% lower, in terms of the combustion efficiency, than the light-off performance curve Le for the exhaust pipe injection because the fuel dilutes the oil in the cylinder(s).

In this embodiment, when the catalyst is fresh, a region until the catalyst temperature Ta (e.g., 200 degrees C.) is reached is defined as a multiple-injection region. A region from the catalyst temperature Ta to the catalyst temperature Tb (e.g., 220 degrees C.) is defined as a post injection region (or the multiple-injection region if the multiple-injection continues). A region equal to and higher than the catalyst temperature Tb is defined as an exhaust pipe injection region. After the catalyst has deteriorated, a region until the catalyst temperature Tb is reached is defined as the multiple-injection region. A region from the catalyst temperature Tb to the catalyst temperature Tc (e.g., 250 degrees C.) is defined as the post injection region (or the multiple-injection region if the multiple-injection continues). A region equal to and higher than the catalyst temperature Tb is defined as the exhaust pipe injection region. In this manner, the respective activation temperatures are set.

When the DPF is regenerated, the ECU 32 estimates the catalyst temperature from the inlet temperature and the outlet temperature of the catalyst (DOC), which are entered from the temperature detecting unit 33. The ECU 32 then selects the combustion efficiency K and selects the multiple-injection, the post injection or the exhaust gas injection from the light-off performance map 36 on the basis of the catalyst temperature.

Specifically, when the catalyst is fresh and the catalyst temperature is below the catalyst temperature Ta (200 degrees C.), i.e., when the control is performed in the before-deterioration sequence, the multiple-injection (pilot injection, pre injection, main injection or after injection is properly selected for fuel injection) is carried out to raise the exhaust gas temperature. When the catalyst temperature reaches or exceeds the catalyst temperature Ta, then the posit injection is carried out. This increases the efficiency K as indicated by the light-off performance curve Lp. When the catalyst temperature becomes the catalyst temperature Tb (220 degrees C.), the exhaust pipe injection is carried out. This enables the DPF regeneration at a high efficiency as indicated by the light-off performance curve Le. It should be noted that the multiple-injection may only be carried out (multiple-injection may be continuously carried out), instead of switching the multiple-injection to the post injection, for the purpose of raising the catalyst temperature Tb to 220 degrees C., prior to carrying out the exhaust pipe injection.

In the after-deterioration sequence (the sequence after the catalyst has deteriorated), the multiple-injection may be carried out until, for example, the catalyst temperature Tb (220 degrees C.) is reached. After the catalyst temperature Tb is reached, the multiple-injection may be switched to the post injection, or the multiple-injection may continue, to increase the efficiency K as indicated by the performance curve Lpd. When the catalyst temperature Tc (250 degrees C.) is reached, the fuel injection may be switched to the exhaust pipe injection to increase the efficiency as indicated by the light-off performance curve Led. Ultimately, the PM is burned at the efficiency as indicated by the light-off performance curve Le to regenerate the DPF.

The selection of the light-off performance curves Lp and Le between when the catalyst is fresh and when the catalyst has deteriorated is made basically on the basis of the degree of the deterioration of the catalyst using the age of the catalyst. More specifically, the combustion efficiency is obtained from the exhaust gas temperatures at the inlet and outlet of the catalyst, the degree of the deterioration of the catalyst is decided on the basis of the combustion efficiency and the light-off performance curves Lp and Le of the light-off performance map, the light-off performance is adjusted (corrected) with the degree of the deterioration of the catalyst on the basis of the light-off performance curves Lp and Le as well as the after-deterioration performance curves Lpd and Led. Then, the multiple-injection region, the post injection region, and the exhaust pipe injection region are changed in accordance with the corrected light-off performance.

As described above, the present invention appropriately selects the multiple-injection, the post injection and the exhaust pipe injection even if the catalyst has deteriorated and the light-off performance shifts toward a higher temperature. Accordingly, the present invention can improve the reduction efficiency at a low temperature side. Because the fuel injection can be switched to the post injection or the multiple-injection, without carrying out the exhaust pipe injection, in a low temperature region, and this improves the DPF regeneration efficiency, it is possible to avoid the HC poisoning of the catalyst and subsequent melting and breaking of the catalyst.

Although the above-described embodiment deals with the exhaust pipe injection during the DPF regeneration of the exhaust gas aftertreatment device that has the NOx occlusion reduction catalyst, the present invention may also be applied to the DPF regeneration of the exhaust gas aftertreatment device that has an SCR catalyst, and applied to other exhaust gas aftertreatment devices such as an aftertreatment device that utilizes the exhaust pipe injection for regeneration of the DPF.

What is claimed is:

1. A method of controlling exhaust injection in an exhaust gas aftertreatment device including an exhaust pipe injector at an exhaust pipe of an engine for perform exhaust pipe injection, a diesel oxidation catalyst connected to the exhaust pipe downstream of the exhaust pipe injector, and a diesel particulate filter connected to the exhaust pipe downstream of the diesel oxidation catalyst, the exhaust gas aftertreatment device being configured to perform multiple-injection, post injection and the exhaust pipe injection when particulate matter accumulates in the diesel particulate filter, thereby burning a reduction gas in the diesel oxidation catalyst, raising an exhaust gas temperature, burning the particulate matter, which has accumulated in the diesel particulate filter, for regeneration of the diesel particulate filter, the method comprising:

preparing, in advance, a light-off performance map that indicates a combustion efficiency relative to a diesel oxidation catalyst temperature in the post injection and in the exhaust pipe injection, both when the catalyst is fresh and when the catalyst has deteriorated;

setting the catalyst temperature that enables the exhaust pipe injection, from a degree of deterioration of the catalyst based on the light-off performance map;

performing the multiple-injection and/or the post injection when the set catalyst temperature is not reached; and performing the exhaust pipe injection when the catalyst temperature reaches or exceeds the set catalyst temperature, wherein the light-off performance map decides activation temperatures from a light-off performance of the catalyst in a multiple-injection region, a post injection region and an exhaust pipe injection region, and the multiple-injection, the post injection and the exhaust pipe injection are sequentially selected based on the catalyst temperature.

2. The method of controlling exhaust injection in an exhaust gas aftertreatment device according to claim 1, wherein the multiple-injection, the post injection, or the exhaust pipe injection is selected based on the catalyst temperature, the degree of the deterioration of the catalyst is determined from the exhaust gas temperature at an inlet and an outlet of the catalyst based on the light-off performance map, the light-off performance is corrected based on the degree of the deterioration of the catalyst, and the multiple-injection region, the post injection region, and the exhaust pipe injection region are changed based on the corrected light-off performance.

3. The method of controlling exhaust injection in an exhaust gas aftertreatment device according to claim 1, wherein said setting the catalyst temperature includes setting the catalyst temperature when the catalyst is fresh, and setting the catalyst temperature when the catalyst has deteriorated.

4. The method of controlling exhaust injection in an exhaust gas aftertreatment device according to claim 3, wherein the set catalyst temperature is 220 degrees C. when the catalyst is fresh, and the set catalyst temperature is 250 degrees C. when the catalyst has deteriorated.

5. The method of controlling exhaust injection in an exhaust gas aftertreatment device according to claim 1, wherein a NOx occlusion reduction catalyst is provided between the diesel oxidation catalyst and the diesel particulate filter.

* * * * *